April 7, 1931.   R. WALLEN   1,800,166
LAWN TRIMMER
Filed April 11, 1930   2 Sheets-Sheet 2
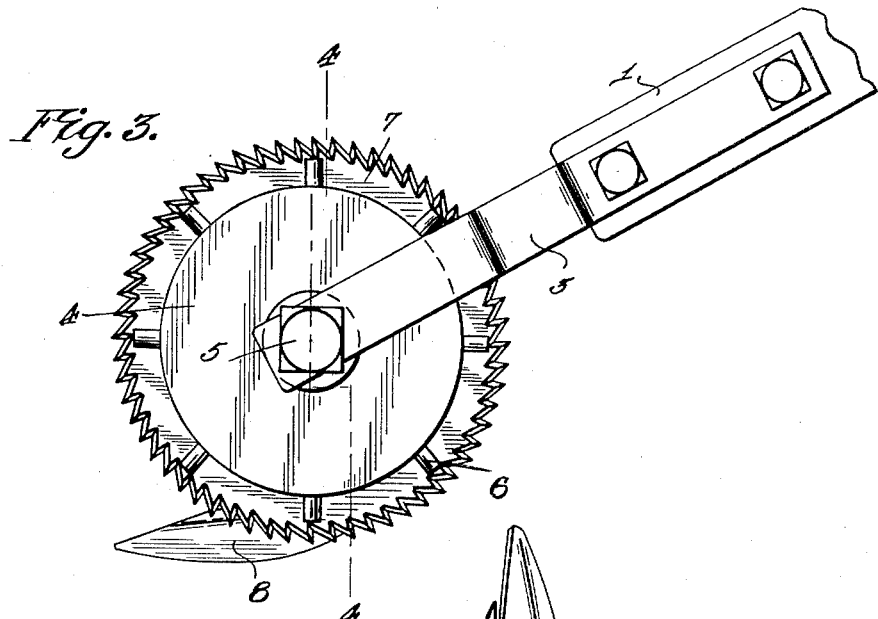
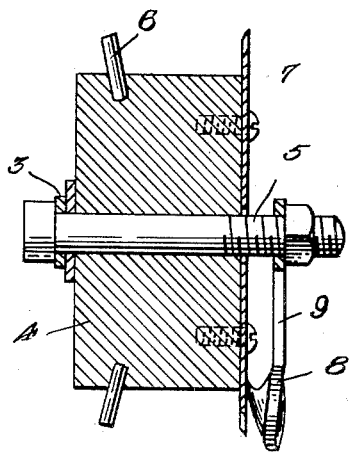
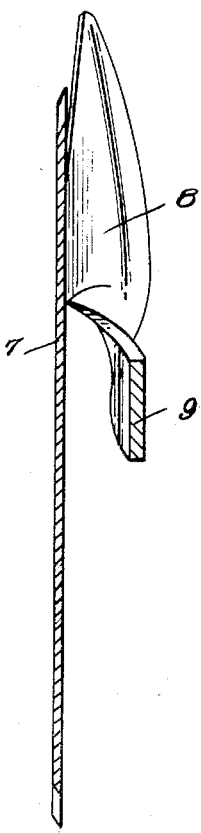
Robert Wallen,
INVENTOR
BY Victor J. Evans
ATTORNEY
WITNESS:

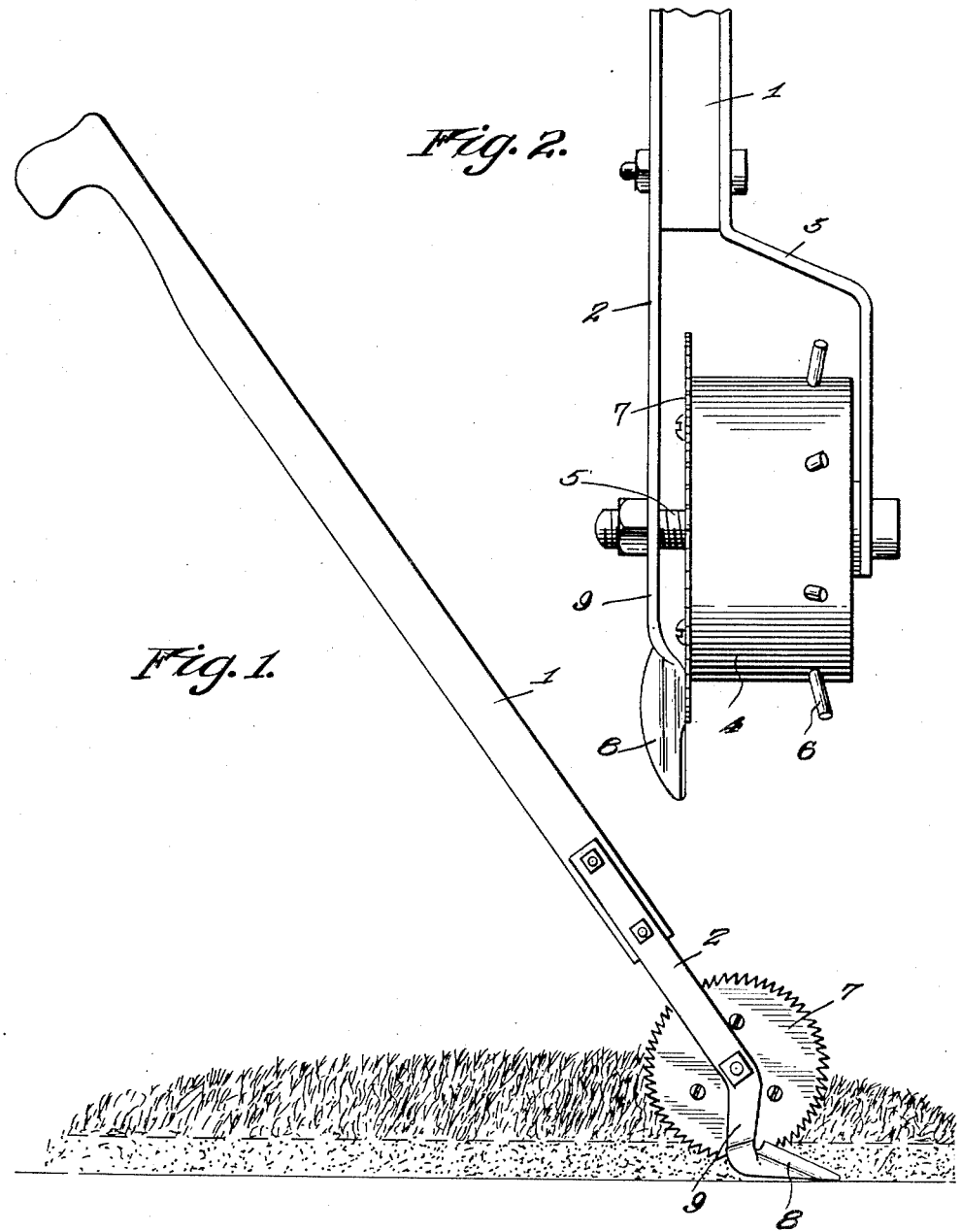

Patented Apr. 7, 1931

1,800,166

UNITED STATES PATENT OFFICE

ROBERT WALLEN, OF TAMPA, FLORIDA

LAWN TRIMMER

Application filed April 11, 1930. Serial No. 443,543.

This invention relates to a lawn trimmer, the general object of the invention being to provide means for trimming the edges of lawns in a clean and smooth manner.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view showing the lawn trimmer in use.

Figure 2 is a front view of the lower part of the lawn trimmer.

Figure 3 is a side view looking toward that end of the drum which is opposite the end which carries the saw.

Figure 4 is a section on line 4—4 of Figure 3.

Figure 5 is a sectional view through the saw and partly through the knife, showing how the knife engages the saw.

In these drawings, the numeral 1 indicates the handle of the device and the numerals 2 and 3 indicate straps of iron or the like connected with the lower end of the handle. The strap 3 is offset so that it is spaced from the strap 2. A drum 4 is located in said space and is rotatably arranged on a bolt 5 which passes through the two straps and forms an axle for the drum. This drum is preferably formed of wood and is provided with the pins or projections 6 which are adapted to engage the ground and cause the drum to rotate as the device is pushed along. A circular saw 7 is fastened to that end of the drum which is adjacent the strap 2 and the lower end of the strap 2 is extended to form a knife 8. The shank 9 of the knife extends downwardly from its point of junction with the strap 2 and the knife extends substantially horizontally from the shank. The upper edge of the knife curves inwardly and this edge is the cutting edge. By curving the knife inwardly, a portion of the cutting edge will contact the periphery of the saw and as shown in Figures 1 and 3, the point of the knife extends in advance of the saw and the point is slightly curved upwardly so that the lower edge of the knife can readily slide along the ground. Thus it will be seen that the knife protects the teeth of the saw and prevents the saw from coming in contact with sidewalks, stones or other objects that would tend to break or dull the teeth. The knife cuts with the saw from the top edge with the point of each saw tooth first contacting the knife and then the heel or bottom of the tooth contacts the knife so as to provide a crowding or jamming action. When this device is pushed along the edge of a lawn, as shown in Figure 1, the knife and the saw will trim the edge and the device is useful for trimming the edges of lawns adjacent sidewalks, walls, fences, around flower beds, trees, etc.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A device for trimming the edges of a lawn comprising a handle, a drum rotatably arranged at the lower end of the handle, a circular saw attached to one end of the drum and of greater diameter than the drum, and a knife member connected with the handle and having a tapered blade part, the upper edge of which is beveled with a portion of said edge contacting the teeth carrying part of the saw while its lower edge is horizontal to engage the ground, the teeth of the saw extending forwardly, whereby the point of each tooth first contacts the knife member and then the heel of the tooth contacts the knife member to provide a crowding or jamming action.

2. A device of the class described comprising a handle having a pair of straps connected with its lower end and extending beyond said lower end, one strap being offset and the other strap being extended to form a downwardly extending shank and a horizontally extending blade, the upper part of the blade being curved inwardly and tapering from its rear edge to its front edge where it forms a point, said upper edge being beveled to form a cutting edge, a drum, an axle for the drum supported by the straps, and a circular saw connected with one end of the drum and of greater diameter than the drum, the teeth carrying portion of the saw contacting the upper part of the cutting edge of the blade.

3. A device of the class described comprising a handle having a pair of straps connected with its lower end and extending beyond said lower end, one strap being offset and the other strap being extended to form a downwardly extending shank and a horizontally extending blade, the upper part of the blade being curved inwardly and tapering from its rear edge to its front edge where it forms a point, said upper edge being beveled to form a cutting edge, a drum, an axle for the drum supported by the straps, a circular saw connected with one end of the drum and of greater diameter than the drum, the teeth carrying portion of the saw contacting the upper part of the cutting edge of the blade, and pins projecting from the circumference of the drum.

In testimony whereof, I affix my signature.

ROBERT WALLEN.